(12) United States Patent
Sonkar et al.

(10) Patent No.: US 11,888,184 B2
(45) Date of Patent: Jan. 30, 2024

(54) POLYMET PLATES WITH ENHANCED ELECTRICALLY CONDUCTIVE PATHWAY AND LOWER CORROSION FOR FUEL CELL

(71) Applicant: Indian Oil Corporation Limited, Mumbai (IN)

(72) Inventors: Kapil Sonkar, Faridabad (IN); Tarun Jindal, Faridabad (IN); Sachin Chugh, Faridabad (IN); Alok Sharma, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 64 days.

(21) Appl. No.: 17/451,276

(22) Filed: Oct. 18, 2021

(65) Prior Publication Data

US 2022/0123325 A1    Apr. 21, 2022

(30) Foreign Application Priority Data

Oct. 17, 2020 (IN) .............................. 202021045274

(51) Int. Cl.
*H01M 8/02* (2016.01)
*H01M 8/0226* (2016.01)
(Continued)

(52) U.S. Cl.
CPC ....... *H01M 8/0226* (2013.01); *H01M 8/0258* (2013.01); *H01M 8/0267* (2013.01); *H01M 8/1004* (2013.01); *H01M 2008/1095* (2013.01)

(58) Field of Classification Search
CPC ............. H01M 8/0226; H01M 8/0223; H01M 8/0228; H01M 8/0258; H01M 8/026;
(Continued)

(56) References Cited

U.S. PATENT DOCUMENTS

| 5,776,624 A | 7/1998 | Neutzler |
| 6,071,635 A | 6/2000 | Carlstrom, Jr. |

(Continued)

FOREIGN PATENT DOCUMENTS

| CN | 101281970 | * 10/2008 | ............. H01M 8/02 |
| JP | 2000173629 A | 6/2000 | |

OTHER PUBLICATIONS

Machine-generated translation of CN 101281970, Doherci et al., "Micro-structured Fuel Cell Element For Improving Water Management", Oct. 8, 2008.*

*Primary Examiner* — Raymond Alejandro
(74) *Attorney, Agent, or Firm* — Workman Nydegger (57) ABSTRACT

The present subject matter pertains to PolyMET plate for a Proton Exchange Membrane fuel cell where the PolyMET plate includes a body made of a polymeric material and comprise a first surface and a second surface opposite to the first surface. Furthermore, the PolyMET plate includes a plurality of in-plane conductive pathways on the first surface defining a reaction area on the first surface, where the plurality of in-plane conductive pathways is formed as a coating of conductive material on the first surface. Moreover, the PolyMET plate also includes a through-plane conductive pathway formed of a solid conductive material extending between the first surface and second surface, such that the through-plane conductive pathway is electrically coupled to the in-plane conductive pathways.

10 Claims, 8 Drawing Sheets
(7 of 8 Drawing Sheet(s) Filed in Color)

(51) Int. Cl.
*H01M 8/0258* (2016.01)
*H01M 8/0267* (2016.01)
*H01M 8/1004* (2016.01)
*H01M 8/10* (2016.01)

(58) Field of Classification Search
CPC ............ H01M 8/0265; H01M 8/0267; H01M 8/1004; H01M 2008/1095
See application file for complete search history.

(56) References Cited

U.S. PATENT DOCUMENTS

| | | |
|---|---|---|
| 8,455,155 B2 | 6/2013 | Abd Elhamid et al. |
| 9,640,806 B2 | 5/2017 | Hsieh et al. |
| 10,396,366 B2 | 8/2019 | Van Boeyen et al. |
| 2003/0152821 A1 | 8/2003 | Daniel et al. |

\* cited by examiner

POLYMET PLATES WITH ENHANCED ELECTRICALLY CONDUCTIVE PATHWAY AND LOWER CORROSION FOR FUEL CELL

FIELD OF THE INVENTION

The present invention covers a PolyMET plate with enhanced electrically conductive pathway and lower corrosion & zero current leakage through coolant for development of PEM fuel cell stack. The present invention also provides a design of the PolyMET plates.

BACKGROUND

PEM fuel cells are of prime interest in transportation applications due to their relatively high efficiency and low pollutant emissions. PEM cell includes mono-polar or bi-polar plates that very vital element of a fuel cell stack. Generally, the plates constitute about 80% of the overall weight and around 45% of the stack total cost. The primary functions of mono-polar plates are: It provides mechanical strength and supports the membrane electrode assembly, provides uniform distribution of reactant gases within the stack, helps in facilitating heat and water management in the stack, and provides electrical connections among individual cells.

Several types of material are currently used in mono-polar plates for PEM fuel cell stack, including non-porous graphite plates, metallic plates with or without coating and a number of polymer composite plates. The materials of the mono-polar plate must have particular properties like excellent electrical & thermal conductivity, low gas permeability, high mechanical strength, low corrosion resistance and low weight.

Graphite is a leading material for monopolar plate construction because of its properties like corrosion resistance and low surface contact resistance or interfacial contact resistance. However, graphite is brittle and occupies large volume due to poor density; it is permeable to gases and exhibits poor mechanical properties. Furthermore, it is not suitable for mass production, since the fabrication of channels in the plate surfaces requires intricate machining, a time-consuming and costly process.

Polymer composite monopolar plates based on the mixture of polymers and graphite particles have been recommended in the literatures. This class of materials allows mass production at a reasonable cost using manufacturing processes such as injection moulding for thermoplastics/thermosets. There are several examples of graphite-based composite monopolar plates using polypropylene (PP), polyphenylene sulfide (PPS), phenolic and vinyl ester resins as matrices. The polymer matrix gives flexibility to the monopolar plate by improving its mechanical strength while on the other hand, electrical conductivity is proportionally diminished. However, incorporation of polymer in graphite minutely reduces the chemical stability.

Metal, as sheets, are potential candidates as monopolar plate material since they have good mechanical stability, electrical and thermal conductivity, and low gas permeability. However, metallic monopolar plate suffers from corrosion issues in anode/cathode chamber due to water generation during electrochemical reaction. As a result, bi-products like, $Ni^{2+}$, $Fe^{3+}$ and $Cr^{3+}$ are formed in a fuel cell corrosive environment, especially on the anode side. The by-products are poisonous to the catalyst layer and solid polymer electrolyte.

In fuel cell stack, the heat generated as a by-product due to electrochemical reactions must be taken away from the stack to maintain the desired temperature inside the cells. Coolant is used to remove the heat from the stack by getting circulated in a closed loop. These coolants are composed of base composition and an additive package. The base composition is either DI water alone or a mixture of DI water with ethylene glycol or propylene glycol. The thermal conductivity of the coolant is supposed to be very high while any increase in electrical conductivity of the coolant is undesirable. Due to high electrical conductivity of coolant two major problems emerge over a period of time:

The electrical current generated in the PEM fuel cells polarises the coolant by creating electric field which causes leakage of electric charge i.e. electricity leak through the coolant and consequently have detrimental effect on the electrical efficiency of the fuel cell. Along with the electricity leakage through coolant, a coolant with high electrical conductivity can electrically short the cells that contribute to stack degradation and performance drop.

An ion balancing unit is placed in coolant loop which is a part of fuel cell system to reduce electrical conductivity of coolant on every cycle, which adds to the system complexity thereby increases the cost of fuel cell system. Various prior solutions exist as disclosed in the following prior arts.

U.S. Pat. No. 6,071,635 relates to plates perfused by liquid or gas, e.g. bipolar plates composed of conductive and non conductive materials. These materials form parts of terminal pads and/or channels on the surfaces of the plates. The conductive materials form electric conduits on the surface of the plate, and the nonconductive materials can form reinforcements and/or seals of the channels or parts of the periphery of the plate Surface.

U.S. Pat. No. 5,776,624 discloses a bipolar plate of welded together metal layers. Located between the metal layers are coolant channels. The layers are conductively coupled via solder metal, preferably Ni alloys.

U.S. Pat. No. 8,455,155 B2 relates to metallic bipolar plates wherein the undulations on the contact interfaces between the bipolar surfaces in contact with the gas diffusion layer is filled with an electrically conductive material such that the contact resistance occurring on that surface is reduced.

U.S. Pat. No. 9,640,806 B2 provides a method of modifying the surface of a metal bipolar plate by press-fitting the metal substrate and the expanded graphite powder so as to form a graphite layer covering the surface of the metal substrate to the effect of sufficiently protecting it.

U.S. Pat. No. 10,396,366 directs a bipolar plate configured to reduce the complexity and cost of manufacturing and assembly for an electrochemical cell by including a polymeric coating applied to atleast one of the frame and the base where the polymeric coating acts as an electrical insulator and/or a corrosion protective layer as well as a seal within the electrochemical cell.

However, none of the aforementioned publications adequately solves the problem of weight, corrosion, and current leakage while maintaining less weight of the fuel cell stack.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The present subject matter relates to the aspects of a PolyMET plate for a proton exchange membrane (PEM) fuel cell. The PolyMET plate is based on a polymeric material and conductive material that allows the PolyMET plate to have less weight over conventional plates thereby increasing the power to weight ratio while maintaining high electrical conductivity.

In an embodiment, a PolyMET plate for a proton exchange membrane (PEM) fuel cell is disclosed. The PolyMET plate includes a body made of a polymeric material and comprises a first surface and a second surface opposite to the first surface. The PolyMET plate includes a plurality of in-plane conductive pathways on the first surface defining a reaction area on the first surface, wherein the plurality of in-plane conductive pathways is formed as a coating of conductive material on the first surface. The PolyMET plate also includes a through-plane conductive pathway formed of a solid conductive material extending between the first surface and second surface, such that the through-plane conductive pathway is electrically coupled to the in-plane conductive pathways.

In another embodiment, a proton exchange membrane (PEM) fuel cell is disclosed that includes a membrane electrode assembly (MEA). The MEA includes a proton exchange membrane (PEM) and a pair of gas diffusion layers sandwiching the PEM." The PEM fuel cell includes the first PolyMET plate and a second PolyMET plate sandwiching the MEA. Further, each of the first and second PolyMET plate includes a body made of a composite of a polymeric material. The body comprises a first surface and a second surface opposite to the first surface. The PolyMET plate includes a plurality of in-plane conductive pathways on the first surface defining a reaction area on the first surface, wherein the plurality of in-plane conductive pathways is formed as a coating of conductive material on the first surface. The PolyMET plate also includes a through-plane conductive pathway formed of a solid conductive material extending between the first surface and second surface, such that the through-plane conductive pathway is electrically coupled to the in-plane conductive pathways.

According to the present subject matter, the polymeric material allows the PolyMET plate to have high mechanical strength, low weight and cost, good gas tightening, low contact resistance, low corrosion resistance and the eradication of the machining process required when producing conventional graphite and metallic monopolar plates. On the other hand, the conductive materials in the polymeric material enable electrical & thermal conductivity, zero current leakage. As a result, the PEM cell based on the PolyMET plates is lightweight while at the same time has required electrical and thermal conductivity to ensure optimal operation of the PEM cell.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

The application file contains at least one drawing executed in color. Copies of this patent application publication with color drawings will be provided by the Office upon request and payment of the necessary fee.

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict or reduce the spirit and scope of the present disclosure in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements of the present disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

Embodiments of the present invention will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

Figure 1:
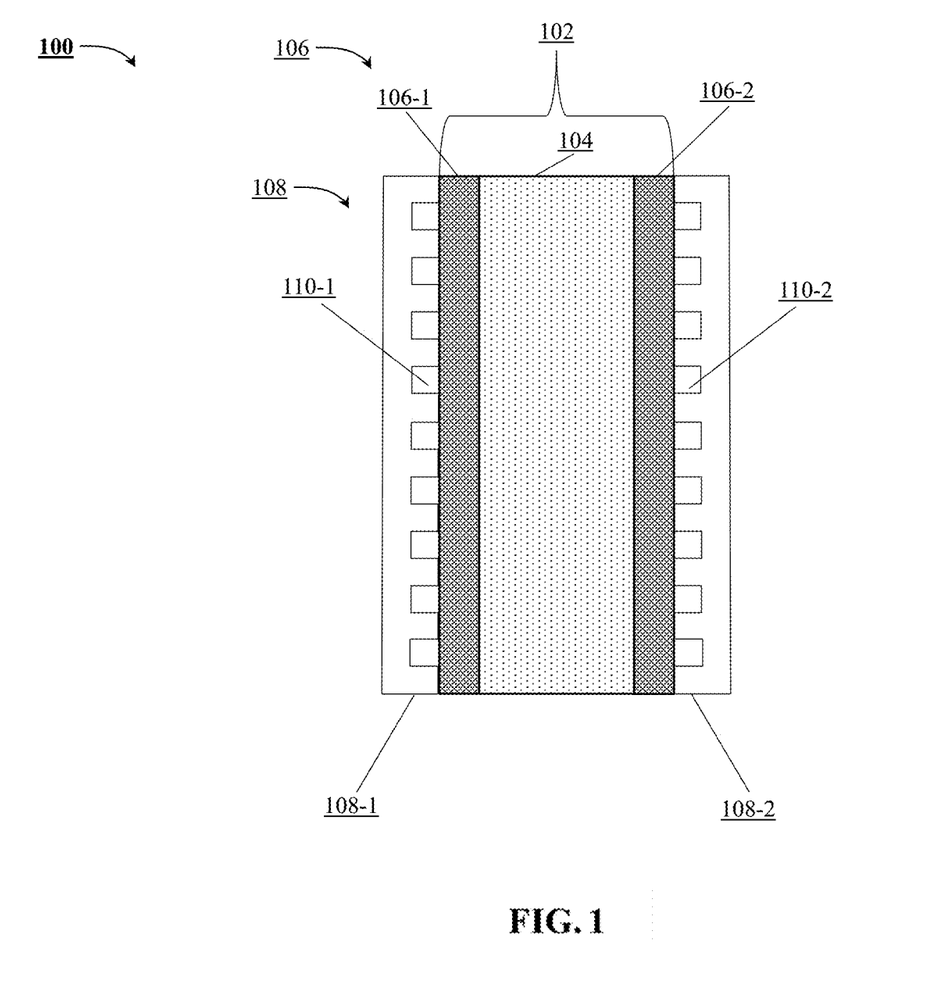
FIG. 1 illustrates a schematic side view of Proton exchange membrane cell, according to an embodiment of the present disclosure.

FIG. 1 illustrates a proton exchange membrane (PEM) fuel cell 100, in accordance with one embodiment of the present disclosure. The PEM fuel cell 100 may be an electrochemical cell employed to generate electricity using gaseous hydrogen as fuel and oxygen as an oxidizer. The PEM fuel cell 100 may employ a catalyst, such as platinum to ionize the hydrogen molecule and release electrons for travelling via an external circuit. The PEM fuel cell 100 may include a membrane electrode assembly (MEA) 102 which may form the core of the PEM fuel cell 100. The MEA 102 may include a proton exchange membrane (PEM) 104 that forms a major section of the MEA 102. The PEM 104 is a semi-permeable membrane that acts as a medium for the passage of the hydrogen ion therethrough while acting as an electronic insulator and barrier for hydrogen gas and oxygen gas.

The MEA 102 may also include a pair of the gas diffusion layer 106 that includes a first gas diffusion layer 106-1 and a second gas diffusion layer 106-2 that sandwiches the PEM 104. The gas diffusion layer 106 is configured to diffuse the gas and air across the surfaces of PEM 104 abutting the gas diffusion layer 106. For instance, the first gas diffusion layer 106-1 may diffuse hydrogen gas evenly on one surface the PEM 104 while the second gas diffusion layer 106-2 may diffuse the oxygen in the air evenly on another surface of the PEM 104. The gas diffusion layer 106 is needed to ensure proper diffusion of the gases to ensure homogenous transmission of the hydrogen ions through one surface of the PEM 104 and homogenous reduction of the hydrogen ions with oxygen to form water at the other surface of PEM 104. The gas diffusion layer 106 may also facilitate the exchange of electrons.

In one example, the PEM fuel cell 100 may include a pair of PolyMET plate 108 that includes a first PolyMET plate 108-1 and a second PolyMET plate 108-2 on either side of the gas diffusion layers 106, such that the pair of PolyMET plates 108 sandwiches the MEA 102. The PolyMET plates 108 are configured to do various tasks. First, the PolyMET plate 108 provide structural strength to the PEM fuel cell 100. In addition, the PolyMET plate 108 allows the supply of fuel and oxygen for the catalytic reaction. Moreover, the PolyMET plate 108 may act as a current collector plate and allows an external circuit to connect thereto. Alternatively, the PolyMET plate 108 may allow coupling of the PEM fuel cell 100 with other PEM fuel cells 100 to form a PEM fuel cell stack of PEM fuel cell 100. In either case, the PolyMET plate 108 allows electrical connection to allow electrons to travel external to the PEM fuel cell 100. Details of the PolyMET plate 108 will be explained later with respect to FIGS. 2 and 3.

In one example, each PolyMET plate 108 may include flow fields 110-1, 110-2 that may provide the path of the distribution of either the fuel or the air to the pair of the gas diffusion layer 106. For instance, the first flow field 110-1 may distribute the hydrogen gas to the gas diffusion layer 106-1 while the second flow field 110-2 may distribute the air to the gas diffusion layer 106-2. In addition, the flow fields 110-1, 110-2 may be made of thermoplastic material that reduces the instance of corrosion. In one example, the rate of corrosion may be reduced by 30% to 40% over a conventional flow field of the same dimensions.

The PEM fuel cell 100 may also include a cooling circuit adapted to circulate a coolant through the PEM fuel cell 100 to remove the heat generated during the operation of the PEM fuel cell 100. In one example, the cooling circuit may be a closed circuit and circulates coolant, such as water. In one example, the cooling circuit may be configured to remove heat from the PolyMET plates 108. Conventionally, the coolant in the cooling circuit gets ionized due to the current leakage from the conventional plates and such ionization affects the cooling performance of the cooling circuit, as well as the ionization of the coolant, which may cause a short circuit of the PEM fuel cell 100. Such an issue is mitigated by the PolyMET plate 108 that prevents current leakage owing to its construction and geometry which will be discussed in detail in subsequent embodiments.

The PEM fuel cell 100 may also include an ion balancing unit (not shown) fluidically coupled to the cooling circuit and may be adapted to reduce electrical conductivity of the coolant thereby enhancing the operational life of the coolant.

In one example, the first PolyMET plate 108-1 is the anode of the PEM fuel cell 100 while the second PolyMET plate 108-2 is the cathode of the PEM fuel cell 100. In one example, the anode PolyMET plates 108-1 and the first gas diffusion layer 106-1 may define an anode chamber while the cathode PolyMET plates 108-2 and the second gas diffusion layer 106-2 form the cathode chamber. Further, the anode PolyMET plate 108-1 may include a catalyst layer thereon to ionise hydrogen gas. During operation, the anode PolyMET plate 108-1 may ionize the hydrogen gas to form hydrogen ions and free electrons. The hydrogen ions in the anode chamber may travel through the solid PEM 104 via the first gas diffusion layer 106-1. On the other hand, the anode PolyMET plate 108-1 may collect the free electrons. Once collected, the electrons on the anode PolyMET plate 108-1 travel to the cathode PolyMET plate 108-2 via an external circuit.

On the other side, the cathode PolyMET plate 108-2 may be coupled to the external circuit and may receive the electrons from the anode PolyMET plate 108-2 via the external circuit. In addition, the cathode PolyMET plate 108-2 may supply electrons to the oxygen molecules in the air and break the oxygen molecule to form the oxygen ions that combine with the hydrogen ions travelled through the PEM 104 to the cathode chamber to form water molecules. Structural details of the PolyMET plate 108 and how the PolyMET plate 108 enables the working of the PEM fuel cell 100 will now be explained.

Figure 2:
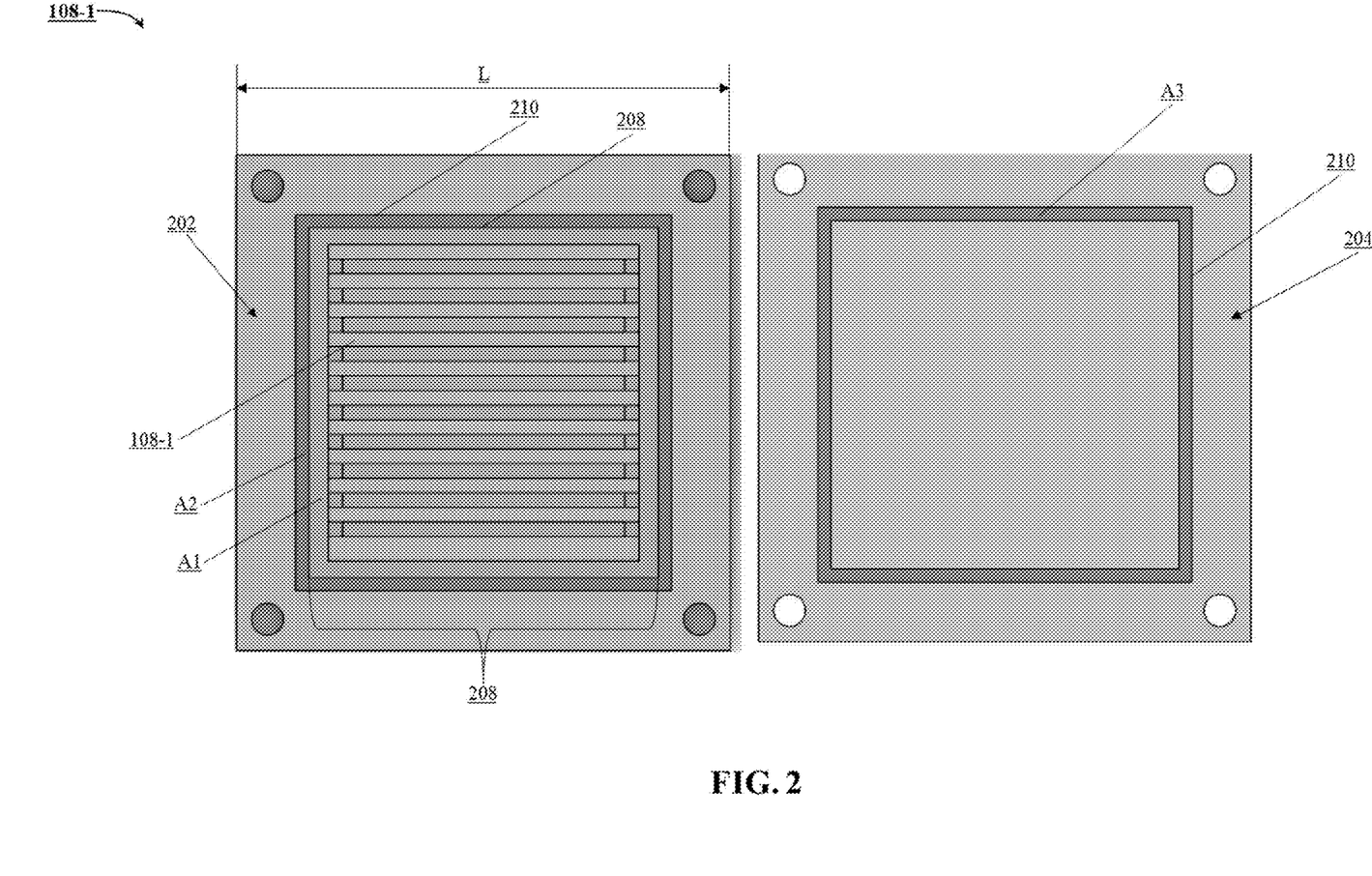
FIG. 2 illustrates a front view and a back view of an anode PolyMET plate, according to an embodiment of the present disclosure.
Figure 3:
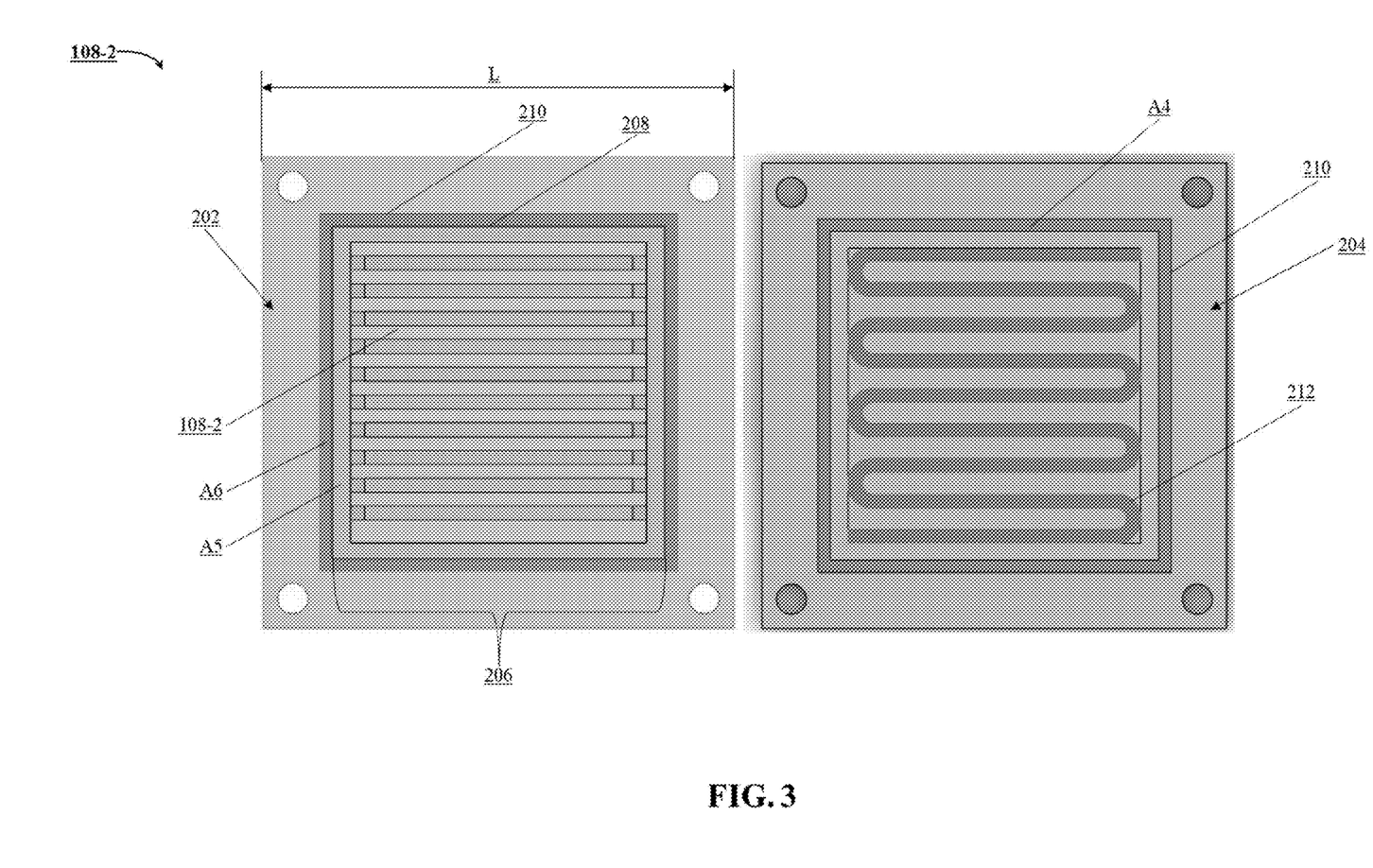
FIG. 3 illustrates a front view and a back view of a cathode PolyMET plate, according to an embodiment of the present disclosure.
Figure 4:
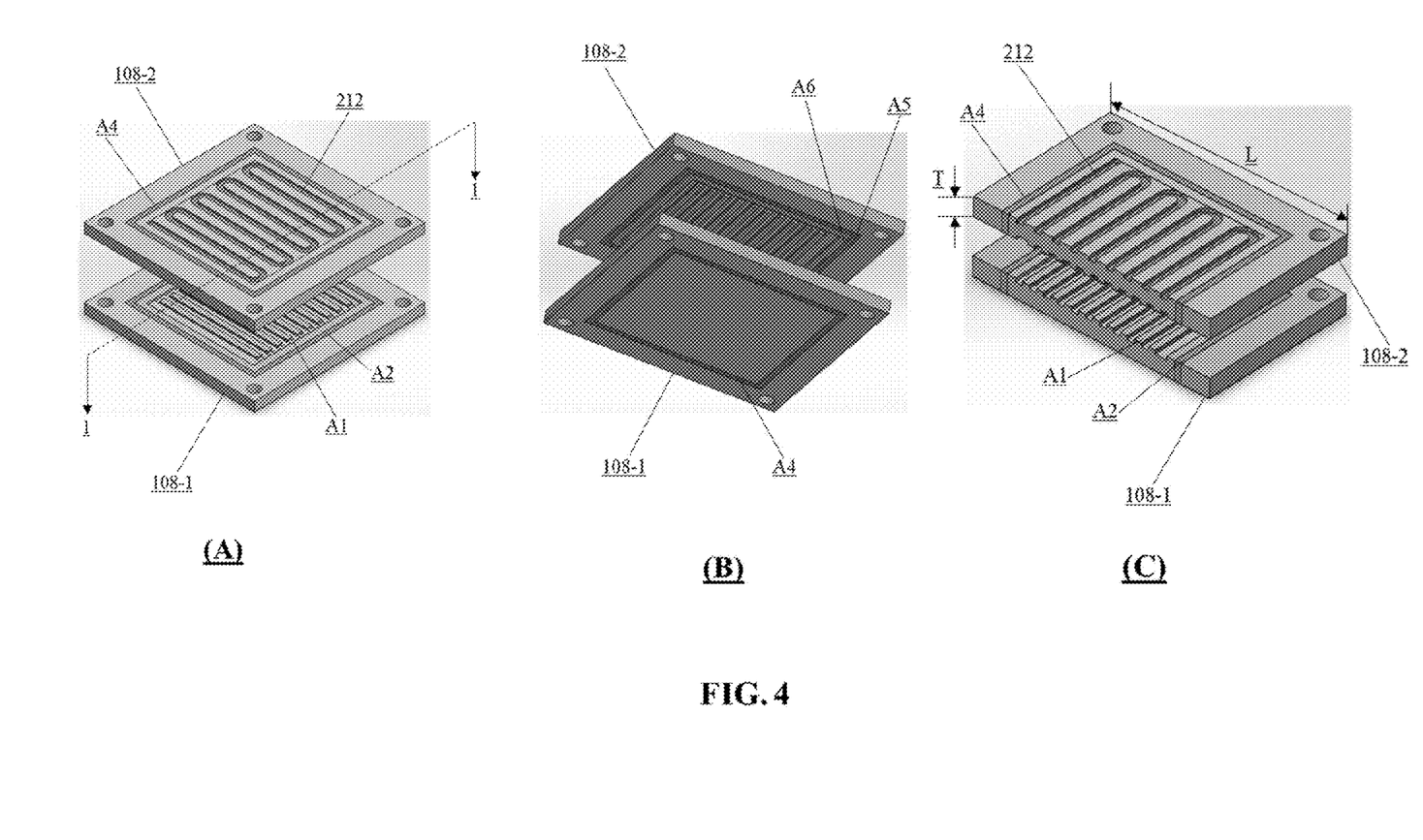
FIG. 4 illustrates relative a top perspective view (A) of the cathode PolyMET plate on top of the anode PolyMET plate, a bottom perspective (B) of the cathode PolyMET plate on top of the anode PolyMET plate, and a cut section (C) taken along lines 1-1 in (A)

FIGS. 2 to 4 illustrate a detailed schematic of the PolyMET plate 108, in accordance with one embodiment of the present disclosure. Specifically, FIG. 2 illustrates a front view and a back view of the anode PolyMET plate 108-1 while FIG. 3 illustrates a front view and a back view of the cathode PolyMET plate 108-2. Further, FIG. 4 illustrates relative a top perspective view (A) of the cathode PolyMET plate 108-2 on top of the anode PolyMET plate 108-1, a bottom perspective view (B) of the cathode PolyMET plate 108-2 on top of the anode PolyMET plate 108-2, and a cut section (C) taken along lines 1-1 in (A).

The PolyMET plate 108 may be a body that may be formed as a metal-polymer composite. In one example, the PolyMET plate 108 may be formed of a polymeric material and a conductive material. In one example, the polymeric material can either be a thermoplastic polymer or a thermosetting polymer. The polymeric material has a good thermal conductivity which enables proper heat dissipation thereby enhancing the performance of the PEM fuel cell 100. In one example, PolyMET plate 108 is formed either as polymeric material alone or as a combination of glass and polymer material of 90-95% by volume.

The use of polymeric material has various advantages over conventional metal-based or graphite-based plates. For instance, the polymeric material is lighter than metal or graphite thereby making the PolyMET plate 108 lighter than the conventional plates. Moreover, the polymeric material can easily be moulded by injection moulding process which is easier than the machining or casting process thereby making the manufacturing of the PolyMET plate 108 economical than the conventional plates. In addition, the polymeric material may have good gas impermeability over conventional graphite-based plates thereby achieving better sealing of the PEM fuel cell 100.

On the other hand, the conductive material is formed to allow the collection and distribution of electric charges in the form of electrons. Unlike the conventional plates made of graphite and metal which collects or distributes the electric charges across the complete surface of the plate, the conductive materials are placed at strategic locations on the surface of the PolyMET plate 108 that enables collection and distribution of the electric charges on the surface of the PolyMET plate 108 without having a need for a complete conductive surface in case of conventional plates. As a result, the electrical conductivity of a conventional plate is achieved by the PolyMET plate 108 without manufacturing the complete PolyMET plate 108 with either metal or graphite. In one example, conductive material can be either a metal, carbon powder, or carbon fillers According to the present disclosure, since the electric charge is formed at strategic locations and not on the complete surface, a negligible volume of the coolant cooling the PolyMET plate 108 makes contact with the locations of the conductive material. Such less contact does not leak current to the coolant cooling the PolyMET plate 108 thereby preventing ionization of the coolant. Moreover, the conductive materials are present inside the PolyMET plate 108 constantly removes the electric charges further preventing current leakage. Prevention of current leakage enhances the operational life and performance of the PEM fuel cell 100. Prevention of current leakage also enables better performance of a stack of the PEM fuel cells 100 where the same coolant is used to cool all the PEM fuel cells 100 because the zero current leakage from one PEM fuel cell 100 does not affect the operation of the other PEM fuel cell 100. Further, prevention of the current leakage also prolongs the operational life of the coolant.

Structural details of the anode PolyMET plate 108-1 and the cathode PolyMET plate 108-2 are now discussed respect to FIGS. 2 to 4. The following description is made with respect to the anode PolyMET plate 108-1 and the cathode PolyMET plate 108-2 simultaneously to maintain brevity. Further, unless referred specifically, the phrase PolyMET plate 108' refers to both the anode PolyMET plate 108-1 and the cathode PolyMET plate 108-2. The body of the PolyMET plate 108 may have a first surface 202 and a second surface 204 opposite to the first surface 202. Further, the first surface 202 and the second surface 204 may have a length L and the body of the PolyMET plate 108 may have a thickness T between the first surface 202 and the second surface 204 as shown in FIG. 4(C). The first surface 202, in one example, may abut the gas diffusion layers 106-1, 106-2 (shown in FIG. 1) while the second surface 204 may be coupled to a collector wire (not shown) or may receive the coolant. The first surface 202 may be profiled to facilitate the operation of the PolyMET plate 108. For instance, the first surface 202 may include a plurality of ribs that may be positioned across the length L of the first surface 202. The ribs may perform two tasks. First, the ribs may allow the collection of the electrons in the case of anode PolyMET plate 108-1 or the release of the electrons in the case of cathode PolyMET plate 108-2. Second, the ribs may provide structural strength to the PolyMET plates 108.

In one example, the PolyMET plate 108 may include conductive pathways. For instance, the PolyMET plate 108 may include a plurality of in-plane conductive pathways 208. The in-plane conductive pathways 208 may be formed as a coating of conductive material on the ribs of the first surface 202. In one example, the in-plane conductive pathways 208 may be formed on the all the surface of the ribs. The in-plane conductive pathways 208 may be present on the first surface 202 and may form a reaction area 206 on the first surface 202. The reaction area 206 may be a region where the electrochemical reaction within the PEM fuel cell 100 may occur. Further, the in-plane conductive pathways 208 may be configured to form a rectangular-shaped reaction area 206.

Further, the in-plane conductive pathways 208 are configured to allow the flow of electrons across the first surface 202. In one example, the in-plane conductive pathways 208 may transfer the electron collected at the ribs in case of the anode PolyMET plate 108-1 as shown in FIG. 2. For instance, the in-plane conductive pathways 208 may collect the electrons through the first gas diffusion layer 106-1 in the case of the first PolyMET plate 108-1. In another example, the in-plane conductive pathways on the ribs may distribute the electrons across the ribs on the first surface 202 in the case of the cathode PolyMET pate 106-2 as shown in FIG. 3.

In addition to the in-plane conductive pathways 208, the PolyMET plate 108 may include a through-plane conductive pathways 210. The through-plane conductive pathways 210 may be formed by a solid conductive material that extends through the body between the first surface 202 and the second surface 204. In one example, the through-plane conductive pathways 210 may be formed on an outer periphery of the in-plane conductive pathways 208 and may be electrically coupled to the in-plane conductive pathways 208 to allow movement of the electrons across the thickness T of the PolyMET plate 108 as shown in FIG. 4 (C). In one example, the through-plane conductive pathways 210 may allow the electrons to flow from the in-plane conductive pathways on the first surface 202 of the anode PolyMET plate 108-2 as shown in FIG. 2. Similarly, the through-plane conductive pathway 210 may allow distribution of the electron to the in-plane conductive pathways 208 of the cathode PolyMET plate 108 as shown in FIG. 3. In one example, the conductive material is 5-10% by volume of the PolyMET 108 imposed in through-plane conductive pathway 210 at an outer periphery of the PolyMET plate 108.

In one example, the second surface 204 of the cathode PolyMET layer 106-2 may include heat removal jacket 212 adapted to receive the coolant. The heat removal jacket 212 may be a part of the cooling circuit for the PEM fuel cell 100. As clearly shown, the contact of the heat removal jackets 212 and the ribs having the in-plane conductive pathways 212 have minimal contact which results in zero current leakage. The heat removal jacket 212 may be formed of a thermoplastic material that does not conduct electricity. As a result, the heat removal jackets 212 may reduce the current leakage to the coolant flowing therethrough.

In one example, the in-plane conductive pathways 208 of the anode PolyMET plate 106-1 is adapted to receive electrons via the first gas diffusion layer 104-1 and the transfer electrons to the through-plane conductive pathways of the cathode PolyMET plate 106-2. A manner by which the transfer takes place is explained with the following operation of the PEM fuel cell 100.

Operation of the PolyMET plate 108 is now described. Referring now to FIG. 2, a portion of first surface 202 of the anode PolyMET layer 106-1 that includes the in-plane conductive pathways 208 are termed first area A1. Further, a portion of the first surface 202 that includes the through-plane conductive pathways 210 is termed second area A2 while a portion of the second surface 202 that includes the through-plane conductive pathways 210 is termed third area A3. Further, the first area A1 and the second area A2 are co-planar and are electrically coupled to each other. Referring now to FIG. 3, a portion of the second surface 204 of the cathode PolyMET layer 106-2 that includes the through-plane conductive pathway 204 is termed fourth area A4 while a portion of the first surface 202 of the cathode PolyMET layer 106-2 that includes the through-plane conductive pathways 204 is termed fifth area A5. Further, a portion of first surface 202 of the cathode PolyMET layer 106-2 that includes the in-plane conductive pathways 208 is termed sixth area A6. Further, the fifth area A5 and the sixth area A6 are co-planar and are electrically coupled to each other.

Referring now to FIGS. 2 and 4, at anode PolyMET plate 108-1, hydrogen oxidation takes place in the anode chamber and is split into protons (hydrogen ions) and electrons on the surface of the anode catalyst layer on the anode PolyMET layer 106-1. The proton transfer takes place from the anode PolyMET layer 106-1 to cathodic PolyMET layer 106-2 through the solid PEM 104 and electrons are transferred from the anode catalyst layer to first area A1 through the first gas diffusion layer 106-1. These electrons are being transferred from the first area A1 to the second area A2. Since the second area A2 and the third area A3 are electrically coupled, the electrons further transfer from the second area A2 to third area A3. The electrons may exit from the anode PolyMET layer 106-1 to an external circuit from the third area A3.

Referring now to FIGS. 3 and 4, at cathode PolyMET plate 108-2, the second surface 204 has the heat removal jacket 212 on one side and on another side, there is a cathode chamber as mentioned before. In the cathode chamber, an oxygen reduction reaction takes place and needs electrons to complete the electrochemical reaction. These electrons can be received by the fourth area A4 of the cathode PolyMET plate 108-2 as shown in FIG. 3 via the external circuit. Further, the requisite electrons for oxygen reduction reaction can be transferred from the fourth area A4 to the fifth area A5 by the through-plane conductive pathways 210. The fifth area A5 transfers the electrons to the sixth area A6 on the cathode PolyMET plate 108-2 and the in-plane conductive pathways 208 at the sixth A6 provide electrons to reduce oxygen into oxygen ions which combines with hydrogen ions to form water.

Figure 5:
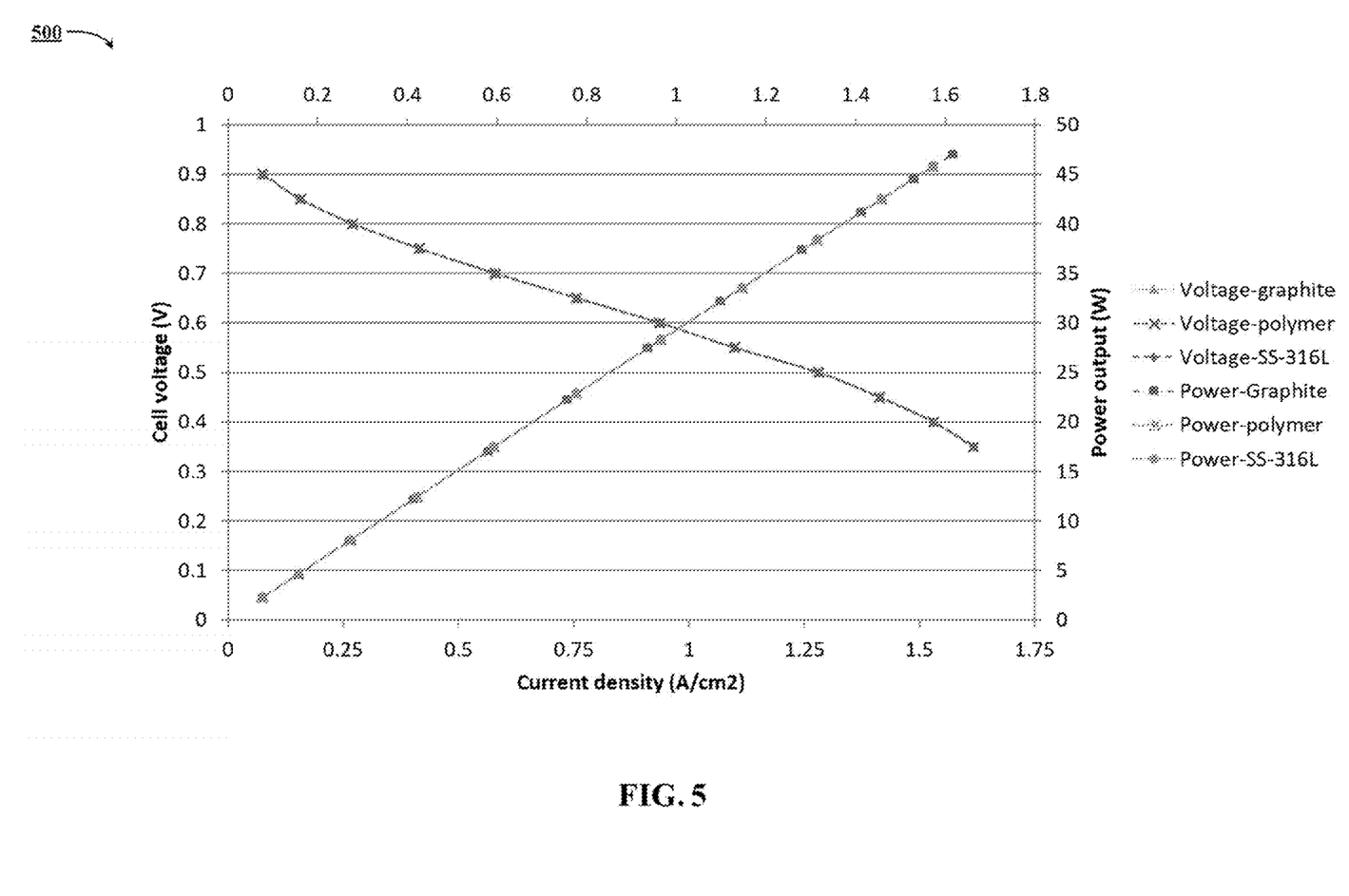
FIG. 5 illustrates a I-V polarization curve and power density curve for PolyMET plate and conventional monopolar plate with graphite and SS as plate material, according to an embodiment of the present disclosure.
Figure 6:
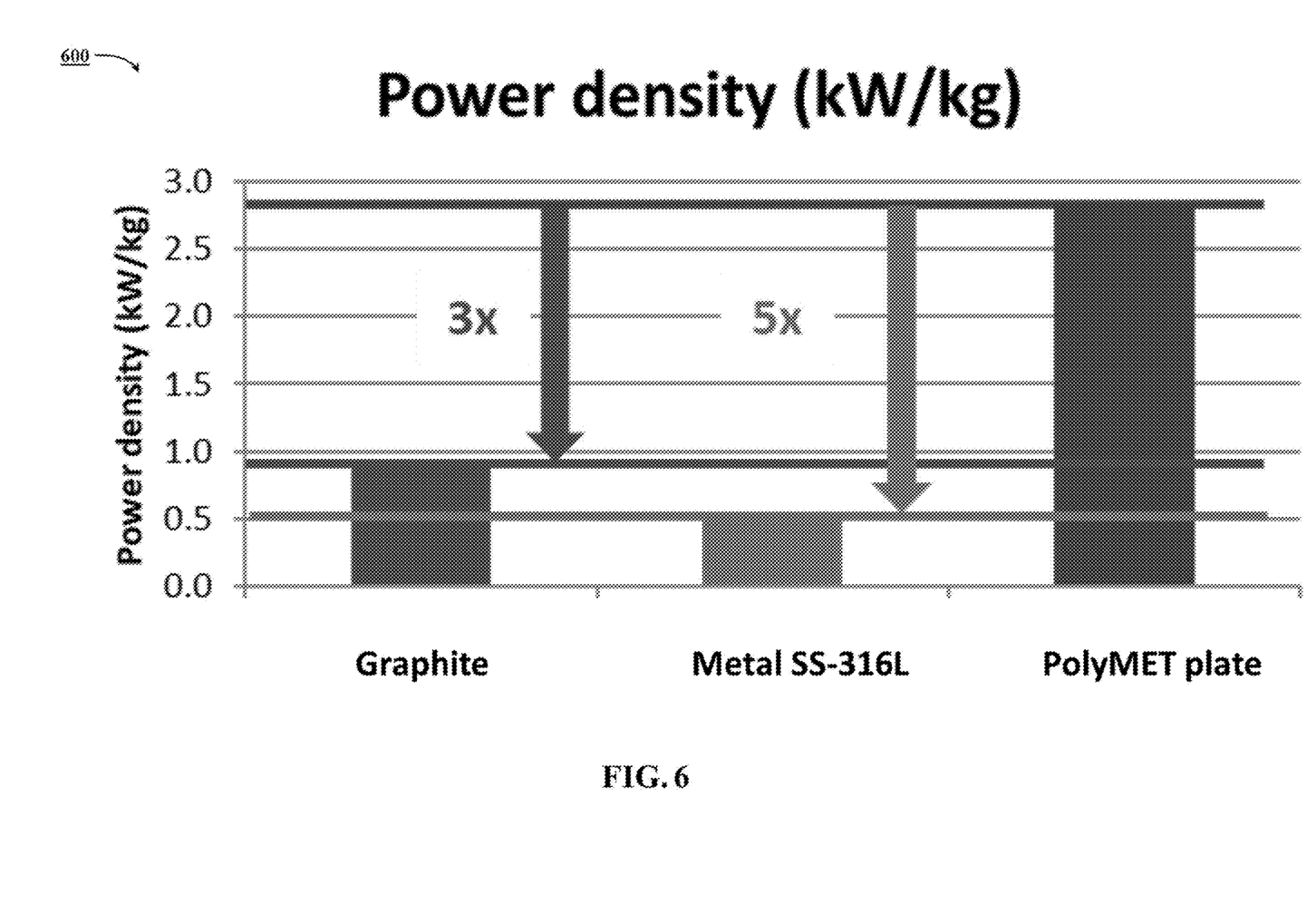
FIG. 6 illustrates a showing a comparison of the power density of PolyMET plate with conventional graphite/SS monopolar plate for PEM fuel cell application.
Figure 7:
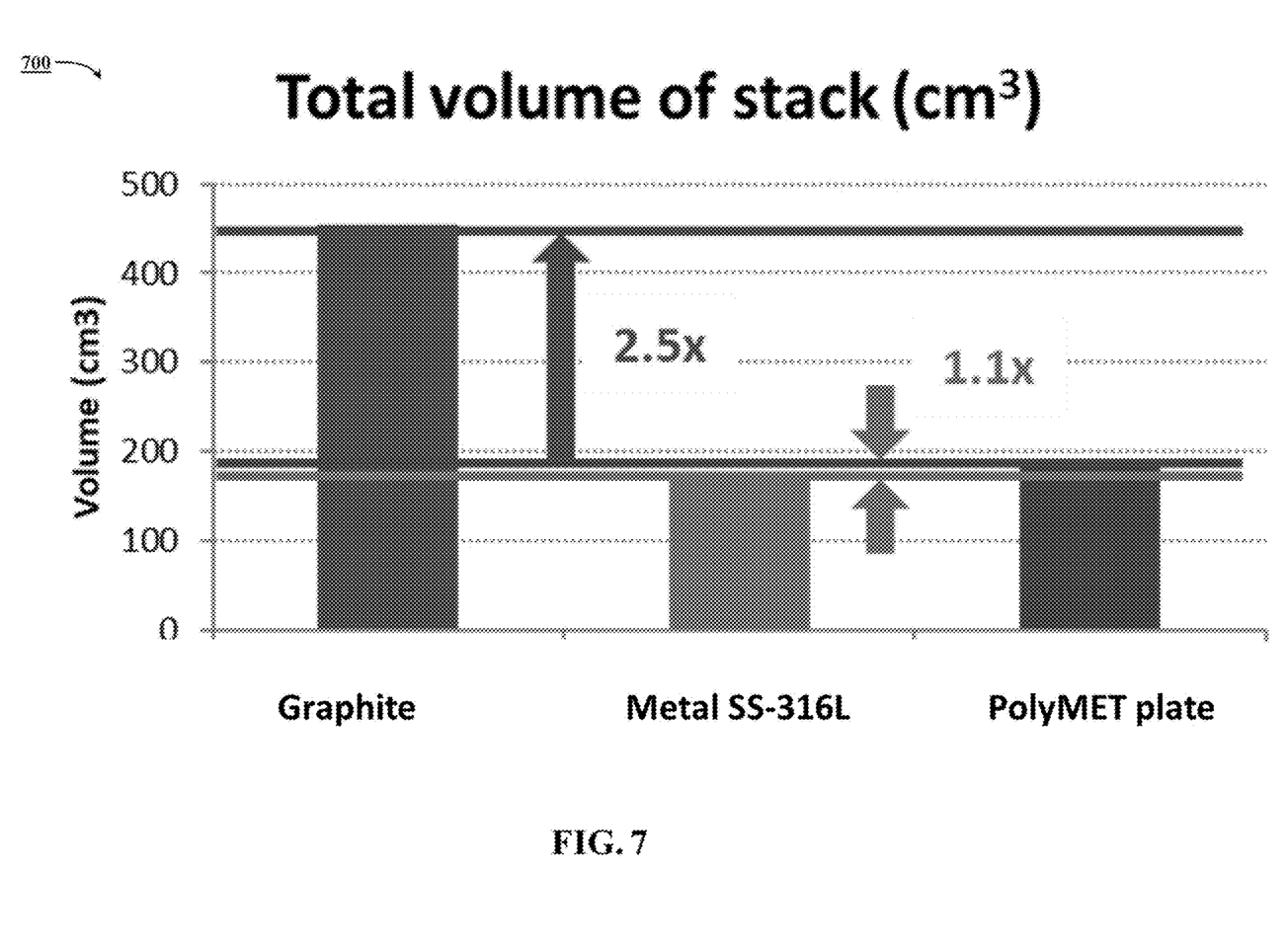
FIG. 7 illustrates a graph showing a comparison of the total volume of a stack of the PolyMET plate with conventional graphite/SS monopolar plate for PEM fuel cell application.
Figure 8:
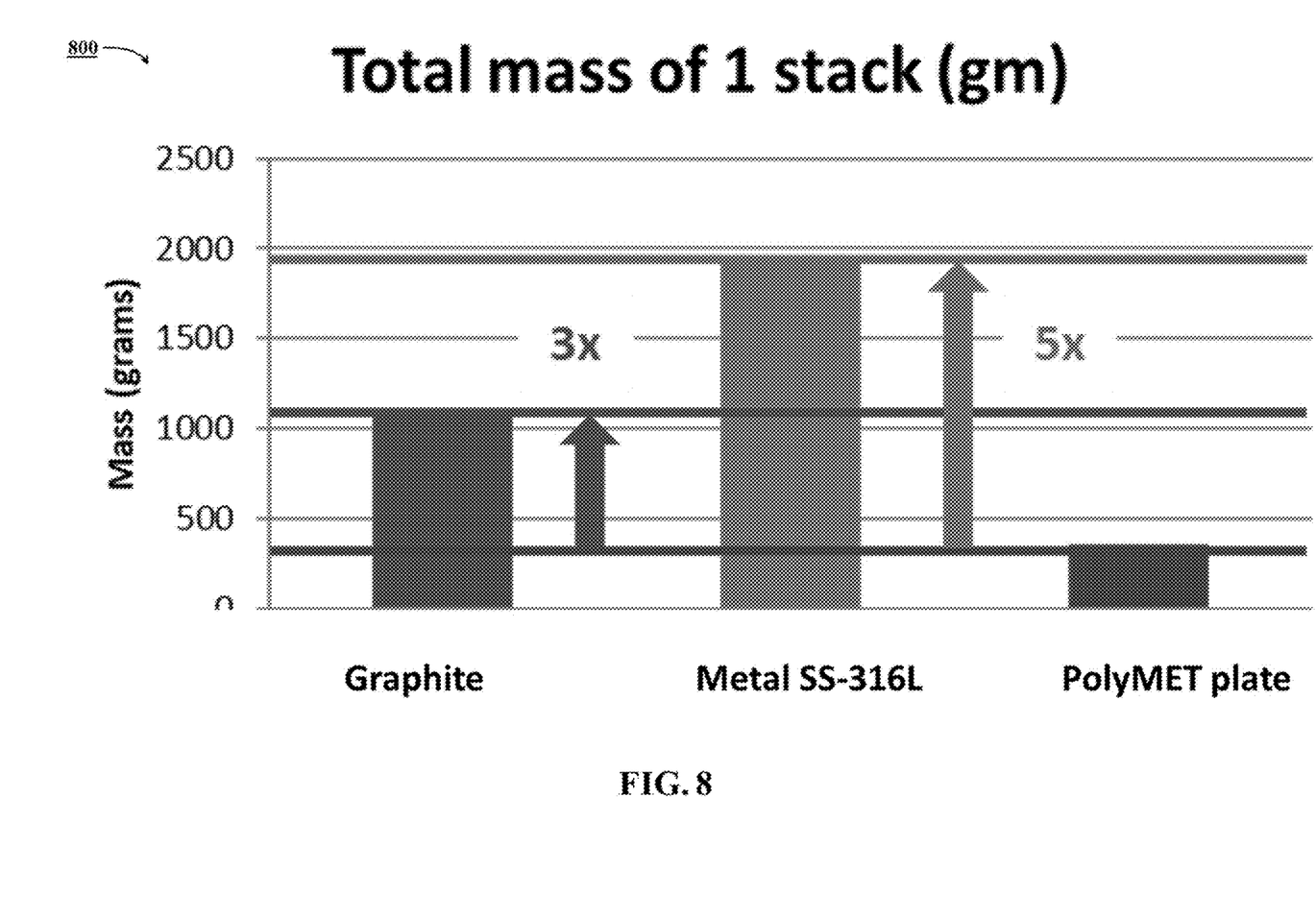
FIG. 8 illustrates graph showing a comparison of the total mass of the stack of the PolyMET plate with conventional graphite/SS monopolar plate for PEM fuel cell application.

FIGS. 5 to 7 indicate simulation data showing the advantages of the PolyMET plate 108 over conventional plates. Specifically, FIG. 5 shows an I-V polarization curve 500 and power density curve for PolyMET plate and conventional monopolar plate with graphite and SS as plate material. Further, FIG. 6 illustrates a graph 600 showing a comparison of the power density of PolyMET plate 108 with conventional graphite/SS monopolar plate for PEM fuel cell application and FIG. 7 illustrates a graph 700 showing a comparison of the total volume of a stack of the PolyMET plate 108 with conventional graphite/SS monopolar plate for PEM fuel cell application. Further, FIG. 8 illustrates graph 800 showing a comparison of the total mass of the stack of the PolyMET plate 108 with conventional graphite/SS monopolar plate for PEM fuel cell application.

For the aforementioned simulation, the design of the PEM fuel cell 100 mono-polar plate 108 and conventional design were drafted having the same dimension for the purpose of comparison of the design with the base design. As a baseline model, standard material properties as available in the fluent database have been used. The PolyMET plate 108 material has been chosen as a thermo-conductive polymer with SS insert on the outer periphery for the through-plane conductive pathways 210. Conventional graphite (ISO-63) and SS-316L has been also individually used as mono-polar plate material for a conventional design of fuel cell plate.

For the simulation process, complex geometries of the PolyMET plate 108 have been divided into simple elements that can be used as discrete local approximations of the larger domain. Pure orthogonal hexahedral mesh has been developed with a high aspect ratio along the length of the cell. For achieving a high convergence rate, gradual expansion of meshes from catalyst layer to gas diffusion layer made. All the common interfaces and edges in the geometry are meshed using the conformal mesh feature so that no sudden change in the elemental mesh is confronted. Using the 'named selection' feature, all the geometry domains and faces are described according to their material and function i.e. solid and fluid domain, symmetrical and wall interfaces etc.

The final geometry with relevant meshing is then used for fluid simulation. Relevant physics (joule heating, electrochemistry sources, butler-volmer rate, half-cell potentials etc.) has been selected for solving the current density while taking into account the liquid saturation in GDL and gas channels, and subsequent computation of liquid removal at the outlet of all the channels.

Inlet boundary conditions are specified as per usual experimental practice. As no ionic current leaves the fuel cell through any external boundary, there is a zero flux boundary condition for the membrane phase potential, on all outside boundaries. For the solid phase potential, there are external boundaries on the anode and the cathode side that are in contact with the external electric circuit. The electrical current generated in the fuel cell only passes through these boundaries. On all other external boundaries, there is a zero-flux boundary condition. Methodology to compute the I-V curve is to first solve the simulation at a high potentiostat voltage (or low current density) of 1.1V and subsequently decreasing cell voltage in steps (increasing current density) of 0.1V to as low as 0.4V. Such methodology allowed the solver to achieve stable values in a short span without divergence.

As indicated in FIG. 5, the voltage curve of the PolyMET plate 108 (Voltage$_{Polymer}$) across the current density overlap with the voltage curve (Voltage$_{graphite}$) of the graphite plate and the voltage curve (Voltage$_{SS-316L}$) of the metal plate. Such an overlap indicates that the PolyMET plate 108 has similar electrical characteristics over graphite and metal plates. Similarly, the power curve of the PolyMET plate 108 (Power Polymer) across the current density overlap with the power curve (Power graphite) of the graphite plate and the power curve (Power SS-316L) of the metal plate. Hereto, the overlap shows the power output achieved by the PolyMET plate 108 is the same as the graphite or metal plate.

As indicated in FIG. 6, the power density of the PolyMET plate 108 may have a power density (kW/kg) that is almost 5× times greater than the power density of the metal plate. Further, the power density of PolyMET plate 108 is further 3× times greater than that of the graphite plate. The higher power density enables a reduction in weight and size to achieve the performance of conventional graphite plate or metal plate-based fuel cells. Such a reduction makes the PEM fuel cell 100 compacts making them ideal for use in automobiles.

Referring now to FIG. 7 that indicates graph 700 showing the total volume of the stack formed by the PolyMET plate 108, the graphite plate, and the metal plate. As shown, the total volume of a stack of the PolyMET plate 108 is less than by 2.5× indicating less volume of the PEM fuel cell 100 thereby making the PEM fuel cell 100 compacts over graphite plate-based fuel cells. On the other hand, the total volume of a stack of the PolyMET plate 108 is greater than by 1.1× to the metal plate-based fuel cell thereby making the PEM fuel cell 100 almost identical in size to the metal plate based on the fuel cell.

Finally, referring now to FIG. 8 that indicates graph 800 showing the total mass of the stack by a factor of 1 gram. The PolyMET plate 108 may have a total mass of stack which is almost 5× times less than total mass of stack of the metal plate. Further, the less than the total mass of the stack of PolyMET plate 108 is further 3× times less than that of the graphite plate. The lesser total mass of stack allows the PEM fuel cell 100 to have less mass According to the present disclosure, the PolyMET plate 108 has following technical advantages over the known solutions:

Reduced mass of the mono-polar plate by 3× graphite to PolyMET plate

Reduced mass of the mono-polar plate by 5× metal to PolyMET plate

Increased power density (kW/kg) of fuel cell stack by 3× graphite to PolyMET plate Increased power density (kW/kg) of fuel cell stack by 5× metal to PolyMET plate Reduced corrosion in reaction area of anode/cathode chamber by 30-40% as compared to metal based monopolar plates.

Enhanced life of coolant being used for removing heat from stack

Zero current leakage by coolant in heat removal jacket, thus improve the performance of fuel cell stack and life.

Removal of an ion balance unit from fuel cell system

Reducing mass of the end plates used for stacking because of lighter PolyMET plate.

Reduction in weight and size of fuel cell stack making it suitable for transport and mobility applications.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A PolyMET plate based on a polymeric and conductive material, for a Proton Exchange Membrane fuel cell, the PolyMET plate comprising:
   a body made of a polymeric material and comprising:
      a first surface, a second surface opposite to the first surface;
      a plurality of in-plane conductive pathways on the first surface defining an electrochemical reaction area on the first surface, wherein the plurality of in-plane conductive pathways is formed on at least one rib on the first surface as a coating of conductive material; and
      a through-plane conductive pathway formed of a solid conductive material extending through the body between the first surface and second surface, wherein the through-plane conductive pathway defines a periphery of the electrochemical reaction area and is electrically coupled to the in-plane conductive pathways, wherein the second surface includes a heat removal jacket, and wherein the heat removal jacket is formed of an electrically insulating thermoplastic material.

2. The PolyMET plate as claimed in claim 1, wherein the body comprising one of the polymeric material and a combination of glass and polymer material of 90-95% by volume and the conductive material of 5-10% by volume imposed in through-plane conductive pathways at outer periphery of the PolyMET plate.

3. The PolyMET plate as claimed in claim 2, wherein the body is made of a thermal conductive polymer material and the thermal conductive polymer material is one of thermoset and thermoplastic polymers, and the conductive material is one of a metal, carbon powder, and carbon fillers.

4. The PolyMET plate as claimed in claim 1, wherein the first surface includes a flow field adapted to distribute one of a fuel and air to a gas diffusion layer disposed adjacent to the first surface.

5. The PolyMET plate as claimed in claim 1, wherein the heat removal jacket on the second surface is adapted to circulate a coolant therethrough.

6. A Proton Exchange Membrane (PEM) fuel cell for a stack formed by connecting a series of PEM fuel cell, the PEM fuel cell comprising:
   a membrane electrode assembly (MEA) comprising:
      a Proton Exchange Membrane (PEM);
      a pair of gas diffusion layers sandwiching the PEM; and
      a first PolyMET plate and a second PolyMET plate sandwiching the MEA, each of the first PolyMET plate and the second PolyMET plate comprising the body as claimed in claim 1.

7. The PEM fuel cell as claimed in claim 6, wherein the first PolyMET plate and the second PolyMET plate is cathode of the PEM fuel cell.

8. The PEM fuel cell as claimed in claim 7, wherein the in-plane conductive pathways of the anode PolyMET plate is adapted to receive electrons via the first gas diffusion layer and the transfer electrons to the through-plane conductive pathways of the cathode PolyMET plate.

9. The PEM fuel cell as claimed in claim 1 comprising a cooling circuit fluidically coupled to the heat removal jacket on the second surface of the second PolyMET plate formed of a thermoplastic material to dissipate heat during an operation of the PEM fuel cell, wherein the polymeric material inhibits current leakage to the coolant as it is not electrically connected with other boundary.

10. The PEM fuel cell as claimed in claim 9 comprising an ion balancing unit fluidically coupled to the cooling circuit and adapted to reduce electrical conductivity of the coolant.

* * * * *